US008681963B2

(12) United States Patent
LeBlanc et al.

(10) Patent No.: US 8,681,963 B2
(45) Date of Patent: Mar. 25, 2014

(54) METHOD FOR SENDING RECORDED CONFERENCE CALL CONTENT

(75) Inventors: Michael LeBlanc, Fredericton (CA); Jacob Samuel O'Reilly, Fredericton (CA); Michael Derek Waugh, Fredericton (CA); Steven Earle Douglass, Fredericton (CA); Ian Brian DeLong, Fredericton (CA); Ian Meredith Murphy, Fredericton (CA); Michael Douglas Tyler, Fredericton (CA)

(73) Assignee: BlackBerry Limited, Waterloo, Ontario (CA)

( * ) Notice: Subject to any disclaimer, the term of this patent is extended or adjusted under 35 U.S.C. 154(b) by 285 days.

(21) Appl. No.: 13/156,469

(22) Filed: Jun. 9, 2011

(65) Prior Publication Data

US 2012/0314849 A1    Dec. 13, 2012

(51) Int. Cl.
    *H04M 3/42*        (2006.01)
(52) U.S. Cl.
    USPC ..................................... 379/202.01; 455/416
(58) Field of Classification Search
    USPC ................ 379/93.21, 158, 202.01–206.01
    See application file for complete search history.

(56) References Cited

U.S. PATENT DOCUMENTS

| 6,418,214 | B1 * | 7/2002 | Smythe et al. ........... 379/202.01 |
| 7,426,192 | B2 | 9/2008 | Amano et al. |
| 7,548,951 | B2 | 6/2009 | Nagayama et al. |
| 7,567,662 | B1 | 7/2009 | Renner |
| 8,045,693 | B2 * | 10/2011 | Yao .......................... 379/220.01 |
| 8,140,980 | B2 * | 3/2012 | Gunasekar et al. ........... 715/753 |
| 2004/0184586 | A1 * | 9/2004 | Coles et al. ................. 379/88.14 |
| 2004/0228531 | A1 * | 11/2004 | Fernandez et al. ............ 382/187 |
| 2005/0031110 | A1 * | 2/2005 | Haimovich et al. ...... 379/202.01 |
| 2006/0234735 | A1 * | 10/2006 | Digate et al. .................. 455/466 |
| 2007/0214217 | A1 * | 9/2007 | Ueno et al. ..................... 709/204 |
| 2007/0239898 | A1 * | 10/2007 | Friend et al. ................... 709/248 |
| 2008/0159511 | A1 * | 7/2008 | Keohane et al. ......... 379/202.01 |
| 2009/0319916 | A1 * | 12/2009 | Gudipaty et al. ............. 715/753 |
| 2010/0158232 | A1 * | 6/2010 | Sylvain .................... 379/202.01 |
| 2011/0208819 | A1 * | 8/2011 | Roskowski et al. ........... 709/206 |
| 2012/0188330 | A1 * | 7/2012 | Turner ....................... 348/14.08 |

OTHER PUBLICATIONS

European Search Report dated Nov. 28, 2011 for corresponding European Patent Application No. 11169349.5.

* cited by examiner

*Primary Examiner* — Simon Sing
*Assistant Examiner* — Solomon Bezuayehu
(74) *Attorney, Agent, or Firm* — Finnegan, Henderson, Farabow, Garrett & Dunner LLP

(57)    ABSTRACT

A method and communication device for scheduling a conference call. The method includes receiving, in a first communication device, an invitation message containing at least some conference call scheduling information with respect to a scheduled conference call session; displaying an interface in relation to the invitation message, the interface including an option to send a request for recorded conference call content of the scheduled conference call session; receiving an input selecting the option; and sending a communication to a second communication device including a response to the invitation message and including said request for recorded conference call content. A conference call server is also described for sending recorded conference call content to the communication device.

23 Claims, 10 Drawing Sheets

METHOD FOR SENDING RECORDED CONFERENCE CALL CONTENT

TECHNICAL FIELD

Example embodiments relate to conference call systems and methods, for example for sending recorded conference call content.

BACKGROUND

During a conference call, voice or media connections are typically made between two or more communication devices such as telephones or mobile phones.

When an invited participant of a conference call cannot participate in the call, for example due to a meeting conflict, the participant normally misses the discussion and only learns the outcome via a meeting report or word of mouth.

Some conventional conference call systems may flag participation as "mandatory", but may not be truly mandatory in terms of being able to ensure attendance or review from the invited participants.

If the conference call was a learning session where the user is expected to review material presented, it may be difficult to monitor whether the user actually viewed the content.

Other difficulties with existing teleconferencing systems will be apparent to those skilled in the art in view of the detailed description below.

BRIEF DESCRIPTION OF THE DRAWINGS

Reference will now be made, by way of example, to the accompanying drawings which show example embodiments, and in which.

Similar reference numerals may have been used in different figures to denote similar components.

DESCRIPTION OF EXAMPLE EMBODIMENTS

Figure 1:
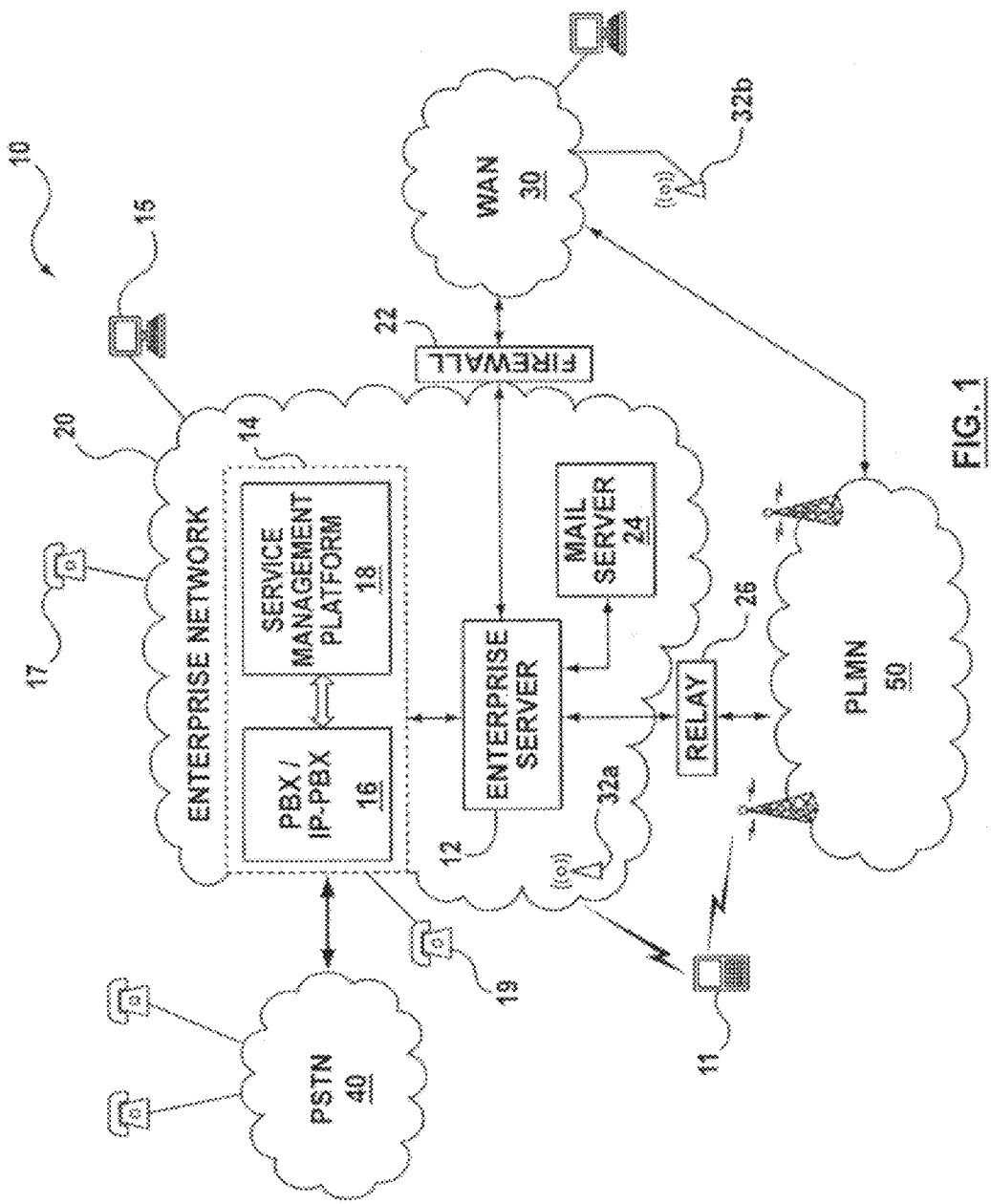
FIG. 1 shows, in block diagram form, an example system for managing enterprise-related mobile calls, including an enterprise communications platform, to which example embodiments may be applied.

Some example embodiments generally relate to sending recorded conference call content, such as video, audio and/or presentation content.

Some example embodiments generally relate to requesting recorded conference call content during scheduling of a conference call session.

In some example embodiments, an invitee device may be permitted to request a record of a conference call content to be sent to the device when the call concludes.

Some example embodiments may be used for teaching or training. For example, if a conference call was a learning session wherein the user is expected to review material presented, example embodiments can monitor the user's progress through the recording and track when the user has completed or to what stage the user completes the viewing of the recording.

In one example embodiment, there is provided a method for scheduling a conference call, the method including: receiving, in a first communication device, an invitation message containing at least some conference call scheduling information with respect to a scheduled conference call session; displaying an interface in relation to the invitation message, the interface including an option to send a request for recorded conference call content of the scheduled conference call session; receiving an input selecting the option; and sending a communication to a second communication device including a response to the invitation message and including said request for recorded conference call content.

In another example embodiment, there is provided a non-transitory computer readable medium having recorded thereon statements and instructions for execution by one or more devices for scheduling a conference call, said statements and instructions comprising code means for performing the method.

In yet another example embodiment, there is provided a communication device including: a controller; a communications subsystem for receiving an invitation message containing at least some conference call scheduling information with respect to a scheduled conference call session; a display for displaying an interface in relation to the invitation message, the interface including an option to send a request for recorded conference call content of the scheduled conference call session; wherein the controller detects an input selecting the option; and wherein the controller controls the communications subsystem to send a communication to a second communication device including a response to the invitation message and including said request for recorded conference call content.

In yet another example embodiment, there is provided a method for sending recorded conference call content from a conference call server, the method including: sending, to a communication device, an invitation message containing at least some conference call scheduling information with respect to a scheduled conference call session; receiving a response to the invitation message; recording conference call content in a memory during the scheduled conference call session; and detecting an absence event with respect to the communication device, and in response automatically sending the recorded conference call content to the communication device after the recording.

In yet another example embodiment, there is provided a conference call server including: a memory for storing conference call scheduling information with respect to a scheduled conference call session; a communications subsystem for communicating with communication devices; and a controller. The controller is configured for: sending, to a communication device, an invitation message containing at least some of the conference call scheduling information with respect to the scheduled conference call session, receiving a response to the invitation message, recording conference call content in the memory during the scheduled conference call session, and detecting an absence event with respect to the communication device, and in response automatically sending the recorded conference call content to the communication device after the recording.

Example embodiments relate to the control and management of conference call communications. Although reference may be made to "calls" and "talk" in the description of example embodiments below, it will be appreciated that some of the described systems and methods may be applicable to session-based communications in general and not limited to voice calls. Reference to calls may for example include shared data (e.g. presentation content) as well as media sessions which may for example include video and/or audio. The various communications may include both synchronous and asynchronous communications to implement such "calls".

Reference is now made to FIG. 1, which shows, in block diagram form, an example system, generally designated 10, for the control and management of communications. The system 10 includes an enterprise or business system 20, which in many embodiments includes a local area network (LAN). In the description below, the enterprise or business system 20 may be referred to as an enterprise network 20. It will be appreciated that the enterprise network 20 may include more than one network and may be located in multiple geographic areas in some embodiments.

The enterprise network 20 may be connected, often through a firewall 22, to a wide area network (WAN) 30, such as the Internet. The enterprise network 20 may also be connected to a public switched telephone network (PSTN) 40 via direct inward dialing (DID) trunks or primary rate interface (PRI) trunks.

The enterprise network 20 may also communicate with a public land mobile network (PLMN) 50, which may also be referred to as a wireless wide area network (WWAN) or, in some cases, a cellular network. The connection with the PLMN 50 may be made via a relay 26, as understood in the art.

The enterprise network 20 may also provide a wireless local area network (WLAN) 32a featuring wireless access points. Other WLANs 32 may exist outside the enterprise network 20. For example, WLAN 32b may be connected to WAN 30.

The system 10 may include a number of enterprise-associated mobile devices 11 (only one shown). The mobile devices 11 may include devices equipped with communications modules for cellular communication through the PLMN 50, mobile devices equipped for Wi-Fi communications over one of the WLANs 32, or dual-mode devices capable of both cellular and data communications. WLANs 32 may be configured in accordance with one of the IEEE 802.11 specifications.

It will be understood that the mobile devices 11 include one or more radio transceivers and associated processing hardware and software to enable wireless communications with the PLMN 50 and/or one of the WLANs 32. In various embodiments, the PLMN 50 and mobile devices 11 may be configured to operate in compliance with any one or more of a number of wireless protocols, including GSM, GPRS, CDMA, EDGE, UMTS, EvDO, HSPA, 3GPP, or a variety of others. It will be appreciated that the mobile device 11 may roam within the PLMN 50 and across PLMNs, in known manner, as the user moves. In some instances, the dual-mode mobile devices 11 and/or the enterprise network 20 are configured to facilitate roaming between the PLMN 50 and a WLAN 32, and are thus capable of seamlessly transferring sessions (such as voice calls) from a connection with the cellular interface of the dual-mode device 11 to the WLAN 32 interface of the dual-mode device 11, and vice versa.

The mobile devices 11 may be various types of communication devices. Such mobile devices 11 may include "Class A" devices, which are able to function continuously as dual-mode devices, capable of both media and data communications. Mobile devices 11 may also include "non-Class A" devices, which may function as dual-mode devices for initialization or prior to connection with the enterprise communications platform 14, but may lose data functionality once a media session (e.g., voice call) is established. The enterprise network 20 may also include additional client devices which are voice-only or media-only devices, which may be digital or analog for communication with the PSTN or PLMN, and which may not have data capabilities (herein referred to as "voice-only" or "media-only" devices). In other embodiments, the mobile devices 11 may include any suitable client device configured with the communications functionality described herein, and may for example include computer devices, relays, proxies, gateways and any appropriate User Agents (as defined in SIP).

The enterprise network 20 typically includes a number of networked servers, computers, and other devices. For example, the enterprise network 20 may connect one or more desktop or laptop computers 15 (one shown). The connection may be wired or wireless in some embodiments. The enterprise network 20 may also connect to one or more digital telephone sets 17 (one shown).

The enterprise network 20 may include one or more mail servers, such as mail server 24, for coordinating the transmission, storage, and receipt of electronic messages for client devices operating within the enterprise network 20. Typical mail servers include the Microsoft Exchange Server™ and the IBM Lotus Domino™ server. Each user within the enterprise typically has at least one user account within the enterprise network 20. Associated with each user account is message address information, such as an e-mail address. Messages addressed to a user message address are stored on the enterprise network 20 in the mail server 24. The messages may be retrieved by the user using a messaging application, such as an e-mail client application. The messaging application may be operating on a user's computer 15 connected to the enterprise network 20 within the enterprise. In some embodiments, the user may be permitted to access stored messages using a remote computer, for example at another location via the WAN 30 using a VPN connection. Using the messaging application, the user may also compose and send messages addressed to others, within or outside the enterprise network 20. The messaging application causes the mail server 24 to send a composed message to the addressee, often via the WAN 30.

The relay 26 serves to route messages received over the PLMN 50 from the mobile device 11 to the corresponding enterprise network 20. The relay 26 also pushes messages from the enterprise network 20 to the mobile device 11 via the PLMN 50.

The enterprise network 20 also includes an enterprise server 12. Generally, the enterprise server 12 is configured to collectively serve the needs of the enterprise network 20, for example to provide and/or synchronize messaging, contacts and calendaring information between servers, desktop workstations 15, and mobile devices 11. Together with the relay 26, the enterprise server 12 functions to redirect or relay incoming e-mail messages addressed to a user's e-mail address within the enterprise network 20 to the user's mobile device 11 and to relay incoming e-mail messages composed and sent via the mobile device 11 out to the intended recipients within the WAN 30 or elsewhere. The enterprise server 12 and relay 26 together facilitate "push" e-mail service for the mobile device 11 enabling the user to send and receive e-mail messages using the mobile device 11 as though the user were connected to an e-mail client within the enterprise network 20 using the user's enterprise-related e-mail address, for example on computer 15.

As is typical in many enterprises, the enterprise network 20 includes a Private Branch eXchange (although in various embodiments the PBX may be a standard PBX or an IP-PBX, for simplicity the description below uses the term PBX to refer to both) 16 having a connection with the PSTN 40 for routing incoming and outgoing voice calls for the enterprise. The PBX 16 is connected to the PSTN 40 via DID trunks or PRI trunks, for example. The PBX 16 may use ISDN signaling protocols for setting up and tearing down circuit-switched connections through the PSTN 40 and related signaling and communications. In some embodiments, the PBX 16 may be connected to one or more conventional analog telephones 19. The PBX 16 is also connected to the enterprise network 20 and, through it, to telephone terminal devices, such as digital telephone sets 17, softphones operating on computers 15, etc. Within the enterprise, each individual may have an associated extension number, sometimes referred to as a PNP (private numbering plan), or direct dial phone number. Calls outgoing from the PBX 16 to the PSTN 40 or incoming from the PSTN 40 to the PBX 16 are typically circuit-switched calls. Within the enterprise, e.g. between the PBX 16 and terminal devices, voice calls are often packet-switched calls, for example Voice-over-IP (VoIP) calls.

The enterprise network 20 may further include a Service Management Platform (SMP) 18 for performing some aspects of messaging or session control, like call control and advanced call processing features. The SMP 18 may, in some cases, also perform some media handling. Collectively the SMP 18 and PBX 16 may be referred to as the enterprise communications platform, generally designated 14. It will be appreciated that the enterprise communications platform 14 and, in particular, the SMP 18, is implemented on one or more servers having suitable communications interfaces for connecting to and communicating with the PBX 16 and/or DID/PRI trunks. Although the SMP 18 may be implemented on a stand-alone server, it will be appreciated that it may be implemented into an existing control agent/server as a logical software component. As will be described below, the SMP 18 may be implemented as a multi-layer platform.

The enterprise communications platform 14 implements the switching to connect session legs and may provide the conversion between, for example, a circuit-switched call and a VoIP call, or to connect legs of other media sessions. In some embodiments, in the context of voice calls the enterprise communications platform 14 provides a number of additional functions including automated attendant, interactive voice response (IVR), call forwarding, voice mail, etc. It may also implement certain usage restrictions on enterprise users, such as blocking international calls or 1-900 calls. In many embodiments, Session Initiation Protocol (SIP) may be used to set-up, manage, and terminate media sessions for voice calls. Other protocols may also be employed by the enterprise communications platform 14, for example, Web Services, Computer Telephony Integration (CTI) protocol, Session Initiation Protocol for Instant Messaging and Presence Leveraging Extensions (SIMPLE), and various custom Application Programming Interfaces (APIs), as will be described in greater detail below.

One of the functions of the enterprise communications platform 14 is to extend the features of enterprise telephony to the mobile devices 11. For example, the enterprise communications platform 14 may allow the mobile device 11 to perform functions akin to those normally available on a standard office telephone, such as the digital telephone set 17 or analog telephone set 15. Example features may include direct extension dialing, enterprise voice mail, conferencing, call transfer, call park, etc.

Figure 2:
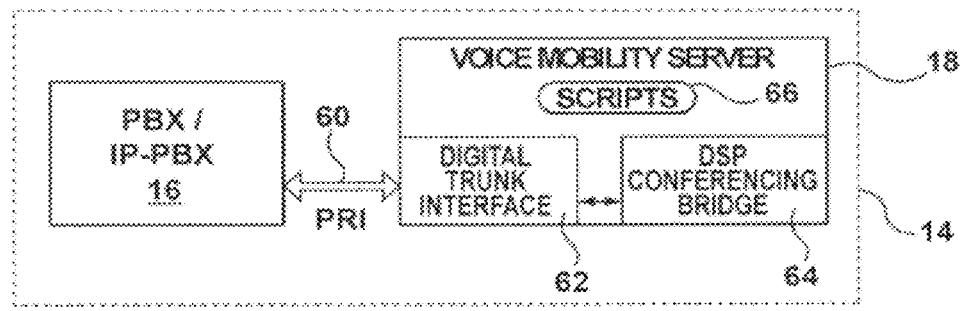
FIG. 2 shows, in block diagram form, further details of an embodiment of the enterprise communications platform.
Figure 3:
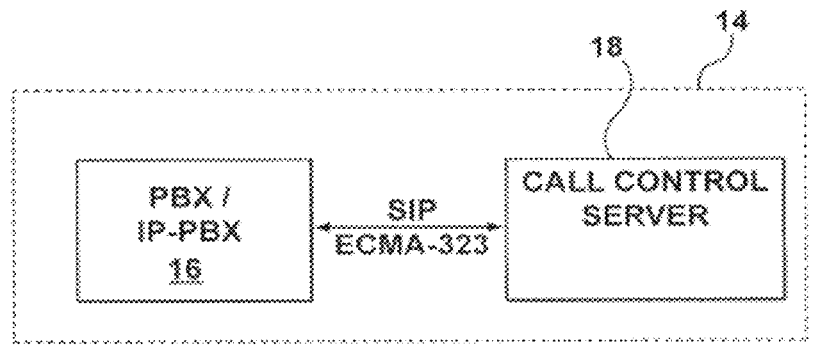
FIG. 3 shows another embodiment of the enterprise communications platform.
Figure 4:
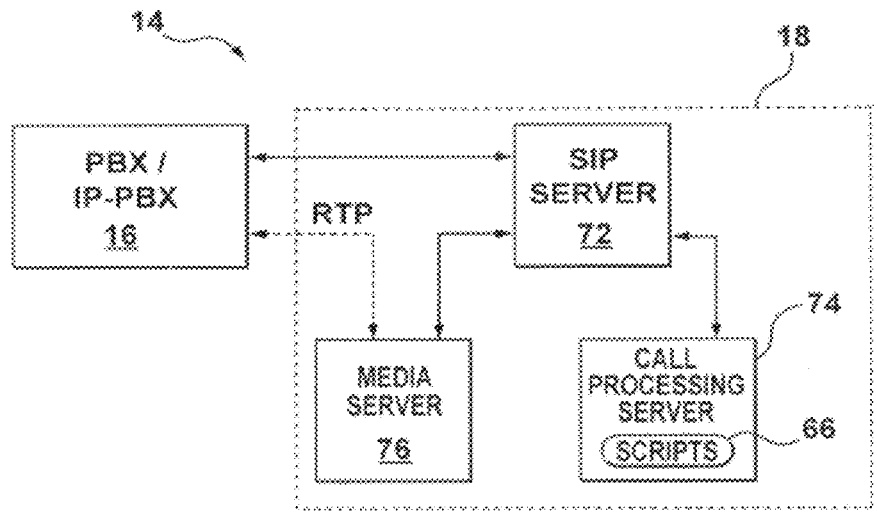
FIG. 4 shows yet another embodiment of the enterprise communications platform.

Reference is now made to FIGS. 2 to 4, which show example embodiments of the enterprise communications system 14. FIG. 2 illustrates an embodiment intended for use in a circuit-switched TDM context. The PBX 16 is coupled to the SMP 18 via PRI connection 60 or other suitable digital trunk. In some embodiments, the PRI connection 60 may include a first PRI connection, a second PRI connection, and a channel service unit (CSU), wherein the CSU is a mechanism for connecting computing devices to digital mediums in a manner that allows for the retiming and regeneration of incoming signals. It will be appreciated that there may be additional or alternative connections between the PBX 16 and the SMP 18.

In this embodiment, the SMP 18 assumes control over both call processing and the media itself. This architecture may be referred to as "First Party Call Control". Many of the media handling functions normally implemented by the PBX 16 are handled by the SMP 18 in this architecture. Incoming calls addressed to any extension or direct dial number within the enterprise, for example, are always first routed to the SMP 18. Thereafter, a call leg is established from the SMP 18 to the called party within the enterprise, and the two legs are bridged. Accordingly, the SMP 18 includes a digital trunk interface 62 and a digital signal processing (DSP) conferencing bridge 64. The DSP conferencing bridge 64 performs the bridging of calls for implementation of various call features, such as conferencing, call transfer, etc. The digital trunk interface 62 may be implemented as a plurality of telephonic cards, e.g. Intel Dialogic cards, interconnected by a bus and operating under the control of a processor. The digital trunk interface 62 may also be partly implemented using a processor module such as, for example, a Host Media Processing (HMP) processor.

The SMP 18 may include various scripts 66 for managing call processing. The scripts 66 are implemented as software modules, routines, functions, etc., stored in non-volatile memory and executed by the processor of the SMP 18. The scripts 66 may implement call flow logic, business logic, user preferences, call service processes, and various feature applications.

FIG. 3 shows another embodiment in which the PBX 16 performs the functions of terminating and/or bridging media streams, but call control functions are largely handled by the SMP 18. In this embodiment, the SMP 18 may be referred to as a call control server 18. This architecture may be referred to as "Third-Party Call Control".

The call control server 18 is coupled to the PBX 16, for example through the LAN, enabling packet-based communications and, more specifically, IP-based communications. In one embodiment, communications between the PBX 16 and the call control server 18 are carried out in accordance with SIP. In other words, the call control server 18 uses SIP-based communications to manage the set up, tear down, and control of media handled by the PBX 16. In one example embodiment, the call control server 18 may employ a communications protocol conforming to the ECMA-269 or ECMA-323 standards for Computer Supported Telecommunications Applications (CSTA).

FIG. 4 shows yet another embodiment of the enterprise communications system 14. This embodiment reflects the adaptation of an existing set of call processing scripts to an architecture that relies on third-party call control, with separate call control and media handling. The SMP 18 includes a call processing server 74. The call processing server 74 includes the scripts or other programming constructs for performing call handling functions. The SMP 18 also includes a SIP server 72 and a media server 76. The separate SIP server 72 and media server 76 logically separate the call control from media handling. The SIP server 72 interacts with the call processing server 74 using a computer-implemented communications handling protocol, such as one of the ECMA-269 or ECMA-323 standards. These standards prescribe XML based messaging for implementing Computer Supported Telecommunications Applications (CSTA).

The SIP server 72 interacts with the media server 76 using SIP-based media handling commands. For example, the SIP server 72 and media server 76 may communicate using Media Server Markup Language (MSML) as defined in IETF document Saleem A., "Media Server Markup Language", Internet Draft, draft-saleem-msml-07, Aug. 7, 2008. The media server 76 may be configured to perform Host Media Processing (HMP).

Other architectures or configurations for the enterprise communications system 14 will be appreciated by those ordinarily skilled in the art. For example, in example embodiments the service management platform 18 may be separate from the PBX 16; or the service management platform 18 may include a cloud-based system.

Figure 5:
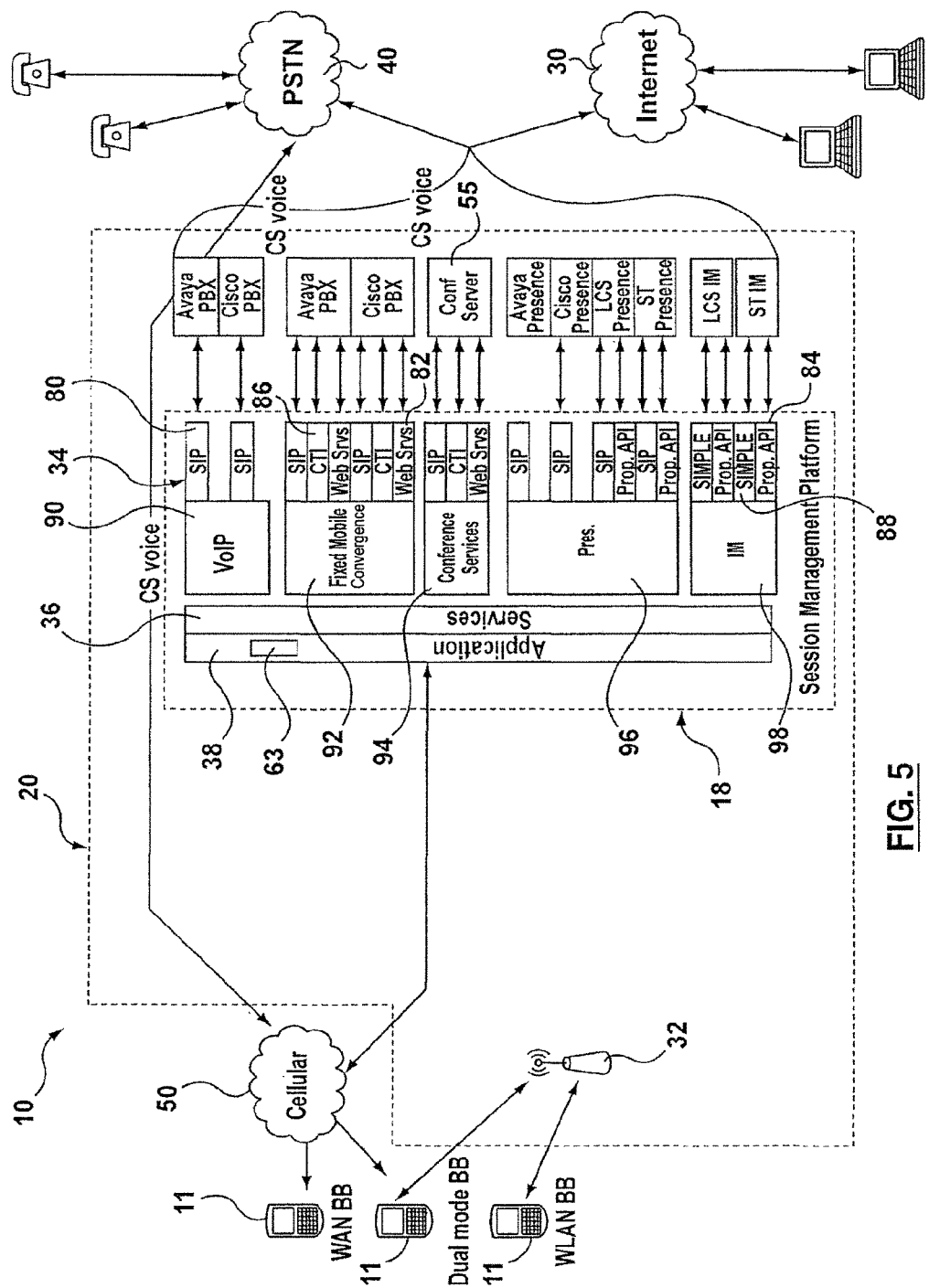
FIG. 5 shows further details of the enterprise communications platform of FIG. 3.

Reference is now made to FIG. 5, which shows another embodiment of the enterprise communications system 14 with a Third Party Call Control architecture. In this embodiment, the SMP 18 is a multi-layer platform that includes a protocol layer 34, a services layer 36 and an application layer 38. The protocol layer 34 includes a plurality of interface protocols configured for enabling operation of corresponding applications in the application layer 38. The services layer 36 includes a plurality of services that can be leveraged by the interface protocols to create richer applications. Finally, the application layer 38 includes a plurality of applications that are exposed out to the communication devices and that leverage corresponding ones of the services and interface protocols for enabling the applications.

Specifically, the protocol layer 34 preferably includes protocols which allow media to be controlled separate from data. For example, the protocol layer 34 can include, among other things, a Session Initiation Protocol or SIP 80, a Web Services protocol 82, an Application Programming Interface or API 84, a Computer Telephony Integration protocol or CTI 86, and a Session Initiation Protocol for Instant Messaging and Presence Leveraging Extensions or SIMPLE protocol 88. It is contemplated that the interface protocols 80-88 are plug-ins that can interface directly with corresponding servers in the enterprise network 20, which will be further described below.

Although SIP 80 may be utilized, it is appreciated that the system 10 can operate using the above disclosed or additional protocols. As known by those of ordinary skill in the art, SIP is the IETF (Internet Engineering Task Force) standard for multimedia session management, and more specifically is an application-layer control protocol for establishing, maintaining, modifying and terminating multimedia sessions between two or more endpoints. As further known by those of ordinary skill in the art, the SIP protocol 80 includes two interfaces for signaling: SIP-Trunk (hereinafter referred to as "SIP-T") and SIP-Line (hereinafter referred to as "SIP-L"). Specifically, the SIP-T interface is utilized when the endpoint is a non-specific entity or not registered (i.e., when communicating between two network entities). In contrast, the SIP-L interface is utilized when the endpoint is registered (i.e., when dialing to a specific extension). SIP is defined in J. Rosenberg et al., "RFC 3261—Session Initiation Protocol" (June 2002), the contents of which are herein incorporated by reference.

The SMP 18 also includes a plurality of enablers, among other things, a VoIP enabler 90, a Fixed Mobile Convergence or FMC enabler 92, a conference services enabler 94, a presence enabler 96 and an Instant Messaging or IM enabler 98. Each of the enablers 90-98 is used by corresponding services in the services layer 36 that combine one or more of the enablers. Each of the applications in the application layer 38 is then combined with one or more of the services to perform the desired application. For example, a phone call service may use the VoIP or PBX enabler, and an emergency response application may use the phone call service, an Instant Messenger service, a video call service, an email service and/or a conference service.

The application layer 38 may include a conference services application 63 that, together with the conference services enabler 94, enables multiple communication devices (including desk telephones and personal computers) to participate in a conference call through use of a centralized conference server 55. As seen in FIG. 5, the conference server 55 is provided in the enterprise network 20 and is in communication with the conference services enabler 94 preferably through the SIP protocol 80, although it is recognized that additional protocols that control media separate from data may be appropriate, such as the Web Services protocol 82 or the CTI protocol 86. As will be described in further detail below, the conference call server 55 is configured for directing media and data streams to and from one or more communication devices (i.e., mobile devices 11, telephones 17, and computers 15).

Example conference call systems and methods in accordance with example embodiments will now be described, referring now to FIG. 6, which shows the system 10 when used or configured as a conference call system. As shown, the enterprise communications platform 14 includes the conference server 55 for providing conference call services for a number of client devices such as mobile devices 11, illustrated as one designated host device 11a and one or more participant devices 11b, 11c, 11d. The mobile devices 11 may collectively form a conference call group. The host device 11a is generally the mobile device 11 or associated user who schedules and hosts a conference call session, and may for example be permitted to perform such hosting functions as roll call, mute all, broadcast only, conference lock, etc.

Generally, in accordance with some example embodiments, the enterprise communications platform 14 may be used to determine whether a device 11 requires a recording of a conference call. For example, the device 11 may have previously indicated that it would decline the conference call. In another example, the enterprise communications platform 14 may determine during the conference call that the device 11 did not attend. During the conference call session, the enterprise communications platform 14 may store in memory a recording of conference call content. After the conference call, the enterprise communications platform 14 may push or send to the absent or requesting device 11 at least some of the recorded conference call content. The recorded conference call content may also be pulled by a request from the device 11.

The enterprise communications platform 14 and the associated conference server 55 may be used for generally executing conference call functions. As described above, in example embodiments, the enterprise communications platform 14 may include or be coupled to the media server 76 (FIG. 4), wherein the enterprise communications platform 14 controls the media handling and media sessions of the media server 76.

Figure 6:
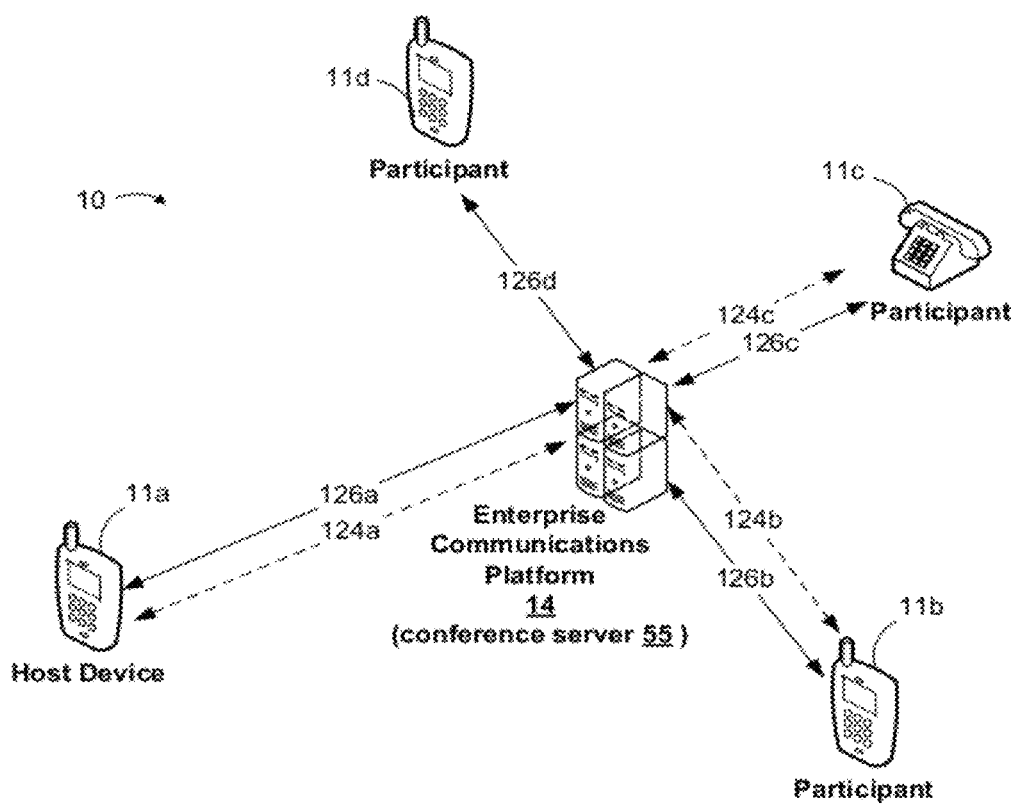
FIG. 6 shows, in block diagram form, a conference call system including the enterprise communications platform shown in FIG. 1 and client devices.

Referring still to FIG. 6, in order to implement some of the conference call functions described herein, the enterprise communications platform 14 may communicate with the mobile devices 11 by way of media sessions and/or control sessions. Specifically, as shown in FIG. 6, the mobile devices 11 communicate via media sessions 126 (shown as solid lines) and control sessions 124 (shown as dashed lines to distinguish from the media sessions 126). For example, the designated host device 11*a* communicates via media session 126*a* and control session 124*a*. Participant device 11*b* communicates via media session 126*b* and control session 124*b*. Participant device 11*c* communicates via media session 126*c* and control session 124*c*. In some embodiments, as shown, the participant device 11*d* may merely communicate via media session 126*d* over the PLMN 50 (FIG. 1) or PSTN 40 (FIG. 1) only (without an associated control session).

In some example embodiments, the media sessions 126 may be facilitated by the enterprise communications platform 14 by way of Real-time Transport Protocol (RTP) media sessions, and may include voice calls, video calls, circuit-switched calls or VoIP calls. In order to generate or establish a conference call session, the enterprise communications platform 14 connects or links at least some of the call legs of each media session 126. The particular methods and processes for connecting of media sessions 126 into a conference call session would be understood by those skilled in the art, which may for example be implemented by media shuffling or SDP (Session Description Protocol) media shuffling, etc.

In some example embodiments, a data connection (e.g. the same data connection as used by the control sessions 124) can be further used to provide additional data sharing between mobile devices 11. For example, during a conference call, the host mobile device 11*a* may provide or transfer a data file to the remaining mobile devices 11. Data sharing may also include Web Services or sharing of presentation content.

In some example embodiments, during a conference call session, the enterprise communications platform 14 can receive Global Positioning System (GPS) information from at least some of the participant devices 11, and can send the received GPS information to the devices 11, to provide location based positioning services between the devices 11.

Figure 7:
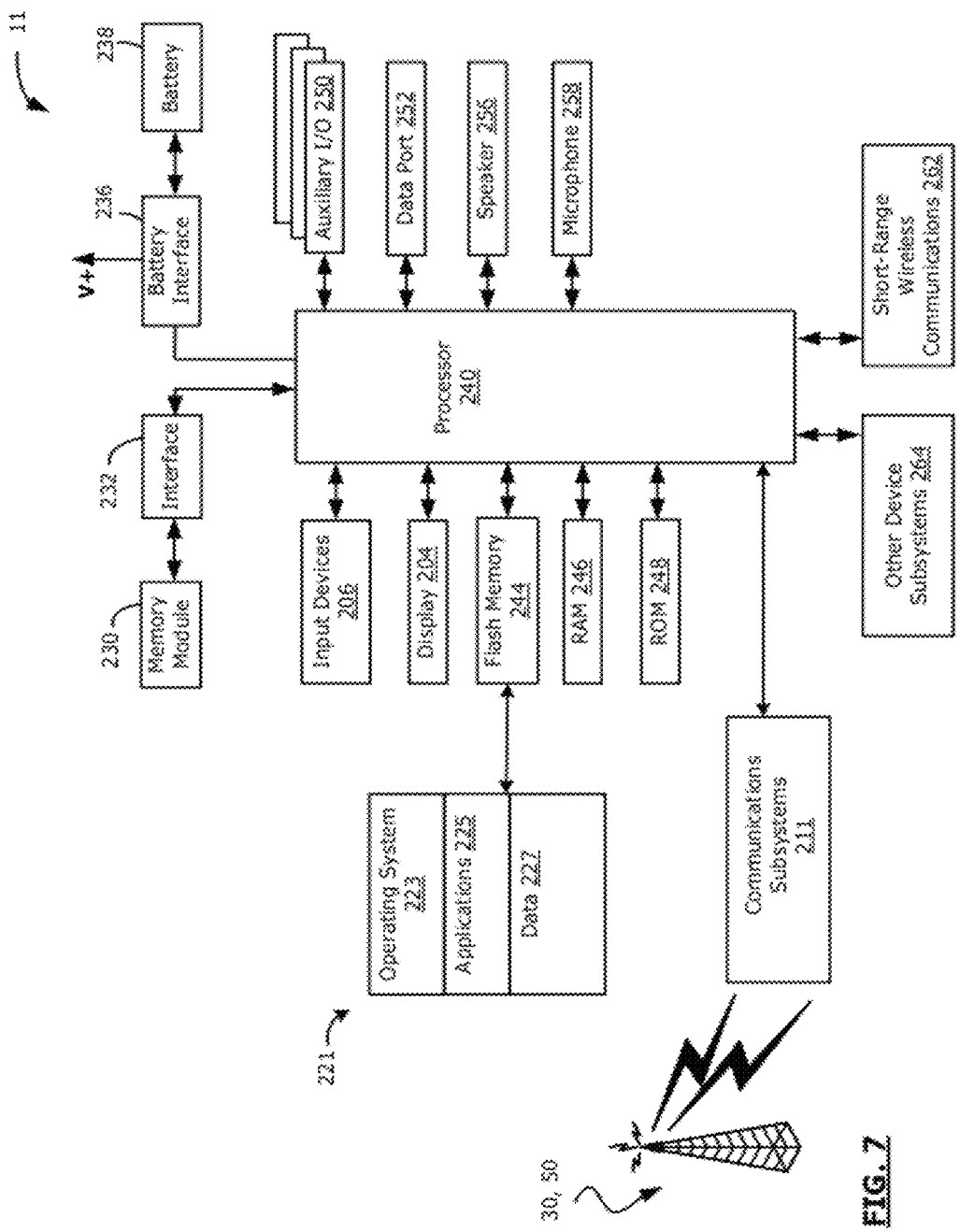
FIG. 7 shows a block diagram illustrating a mobile communication device in accordance with an example embodiment.

Reference is now made to FIG. 7 which illustrates in detail a mobile device 11 in which example embodiments can be applied. The mobile device 11 is a two-way communication device having data and voice communication capabilities, and the capability to communicate with other computer systems, for example, via the Internet. Depending on the functionality provided by the mobile device 11, in various embodiments the mobile device 11 may be a handheld device, a multiple-mode communication device configured for both data and voice communication, a smartphone, a mobile telephone or a PDA (personal digital assistant) enabled for wireless communication.

The mobile device 11 includes a rigid case (not shown) housing the components of the mobile device 11. The internal components of the mobile device 11 may, for example, be constructed on a printed circuit board (PCB). The description of the mobile device 11 herein mentions a number of specific components and subsystems. Although these components and subsystems may be realized as discrete elements, the functions of the components and subsystems may also be realized by integrating, combining, or packaging one or more elements in any suitable fashion. The mobile device 11 includes a controller comprising at least one processor 240 (such as a microprocessor) which controls the overall operation of the mobile device 11. The processor 240 interacts with device subsystems such as a wireless communication subsystem 211 for exchanging radio frequency signals with the wireless network (e.g. WAN 30 and/or PLMN 50) to perform communication functions. The processor 240 interacts with additional device subsystems including a display 204 such as a liquid crystal display (LCD) screen or any other appropriate display, input devices 206 such as a keyboard and control buttons, persistent memory 244, random access memory (RAM) 246, read only memory (ROM) 248, auxiliary input/output (I/O) subsystems 250, data port 252 such as a conventional serial data port or a Universal Serial Bus (USB) data port, speaker 256, microphone 258, short-range communication subsystem 262 (which may employ any appropriate wireless (e.g., RF), optical, or other short range communications technology), and other device subsystems generally designated as 264. Some of the subsystems shown in FIG. 2 perform communication-related functions, whereas other subsystems may provide "resident" or on-device functions.

Display 204 may be realized as a touch-screen display in some embodiments. The touch-screen display may be constructed using a touch-sensitive input surface connected to an electronic controller and which overlays the visible element of display 204. The touch-sensitive overlay and the electronic controller provide a touch-sensitive input device and the processor 240 interacts with the touch-sensitive overlay via the electronic controller.

The wireless communication subsystem 211 includes one or more communication systems for communicating with wireless WAN base stations 30 and wireless LAN access points 32 within the wireless network. The particular design of the wireless communication subsystem 211 depends on the wireless network in which mobile device 11 is intended to operate. The mobile device 11 may send and receive communication signals over the wireless network after the required network registration or activation procedures have been completed.

The processor 240 operates under stored program control and executes software modules 221 stored in memory such as persistent memory 244 or ROM 248. The processor 240 can execute code means or instructions. ROM 248 may contain data, program instructions or both. Persistent memory 244 may contain data, program instructions or both, in some embodiments is rewritable under control of processor 240, and may be realized using any appropriate persistent memory technology, including EEPROM, EAROM, FLASH, and the like. As illustrated in FIG. 2, the software modules 221 comprise operating system software 223 and software applications 225.

Software modules 221 or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely one example, and those skilled in the art will appreciate that a different assignment of functions to types of memory could also be used.

The software applications 225 may further include a range of applications, including, for example, an e-mail messaging application, address book, calendar application, notepad application, Internet browser application, voice communication (i.e., telephony) application, mapping application, or a media player application, or any combination thereof. Each of the software applications 225 may include layout information defining the placement of particular fields and graphic elements (e.g., text fields, input fields, icons, etc.) in the user interface (i.e., the display 204) according to the application.

The modules 221 may further include a Global Positioning System (GPS) module or application which is configured for detection of a geographical position of the device 11, for example by correlating existing satellites. The GPS module may also receive from the enterprise communications platform 14 the geographical positions of the other devices 11.

In some embodiments, the auxiliary input/output (I/O) subsystems 250 may comprise an external communication link or interface, for example, an Ethernet connection. The auxiliary I/O subsystems 250 may further comprise one or more input devices, including a pointing or navigational tool such as a clickable trackball or scroll wheel or thumbwheel, or one or more output devices, including a mechanical transducer such as a vibrator for providing vibratory notifications in response to various events on the mobile device 11 (e.g., receipt of an electronic message or incoming phone call), or for other purposes such as haptic feedback (touch feedback).

In some embodiments, the mobile device 11 also includes one or more removable memory modules 230 (typically comprising FLASH memory) and one or more memory module interfaces 232. Among possible functions of the removable memory module 230 is to store information used to identify or authenticate a user or the user's account to wireless network (e.g. WAN 30 and/or PLMN 50). For example, in conjunction with certain types of wireless networks, including GSM and successor networks, the removable memory module 230 is referred to as a Subscriber Identity Module or SIM. The memory module 230 is inserted in or connected to the memory module interface 232 of the mobile device 11 in order to operate in conjunction with the wireless network.

The mobile device 11 stores data 227 in a persistent memory 244. In various embodiments, the data 227 includes service data comprising information required by the mobile device 11 to establish and maintain communication with the wireless network (e.g. WAN 30 and/or PLMN 50). The data 227 can also include, for example, scheduling and connection information for connecting to a scheduled conference call.

The mobile device 11 also includes a battery 238 which furnishes energy for operating the mobile device 11. The battery may be coupled to the electrical circuitry of mobile device 11 through a battery interface 236, which may manage such functions as charging the battery from an external power source (not shown) and the distribution of energy to various loads within or connected to the mobile device 11. Short-range communication subsystem 262 is an additional optional component which provides for communication between the mobile device 11 and different systems or devices, which need not necessarily be similar devices. For example, the short-range communication subsystem 262 may include an infrared device and associated circuits and components, or a wireless bus protocol compliant communication mechanism such as a BLUETOOTH communication module to provide for communication with similarly-enabled systems and devices.

A predetermined set of applications that control basic device operations, including data and possibly voice communication applications will normally be installed on the mobile device 11 during or after manufacture. Additional applications and/or upgrades to the operating system software 223 or software applications 225 may also be loaded onto the mobile device 11 through the wireless network (e.g. WAN 30 and/or PLMN 50), the auxiliary I/O subsystem 250, the data port 252, the short-range communication subsystem 262, or other suitable subsystem such as 264. The downloaded programs or code modules may be permanently installed, for example, written into the program memory (e.g., the persistent memory 244), or written into and executed from the RAM 246 for execution by the processor 240 at runtime.

The mobile device 11 may provide two principal modes of communication: a data communication mode and an optional voice communication mode. In the data communication mode, a received data signal such as a text message, an e-mail message, Web page download, or an image file will be processed by the wireless communication subsystem 211 and input to the processor 240 for further processing. For example, a downloaded Web page may be further processed by a browser application or an e-mail message may be processed by an e-mail message messaging application and output to the display 204. A user of the mobile device 11 may also compose data items, such as e-mail messages, for example, using the input devices in conjunction with the display 204. These composed items may be transmitted through the wireless communication subsystem 211 over the wireless network (e.g. WAN 30 and/or PLMN 50). In the voice communication mode, the mobile device 11 provides telephony functions and operates as a typical cellular phone.

Figure 8:
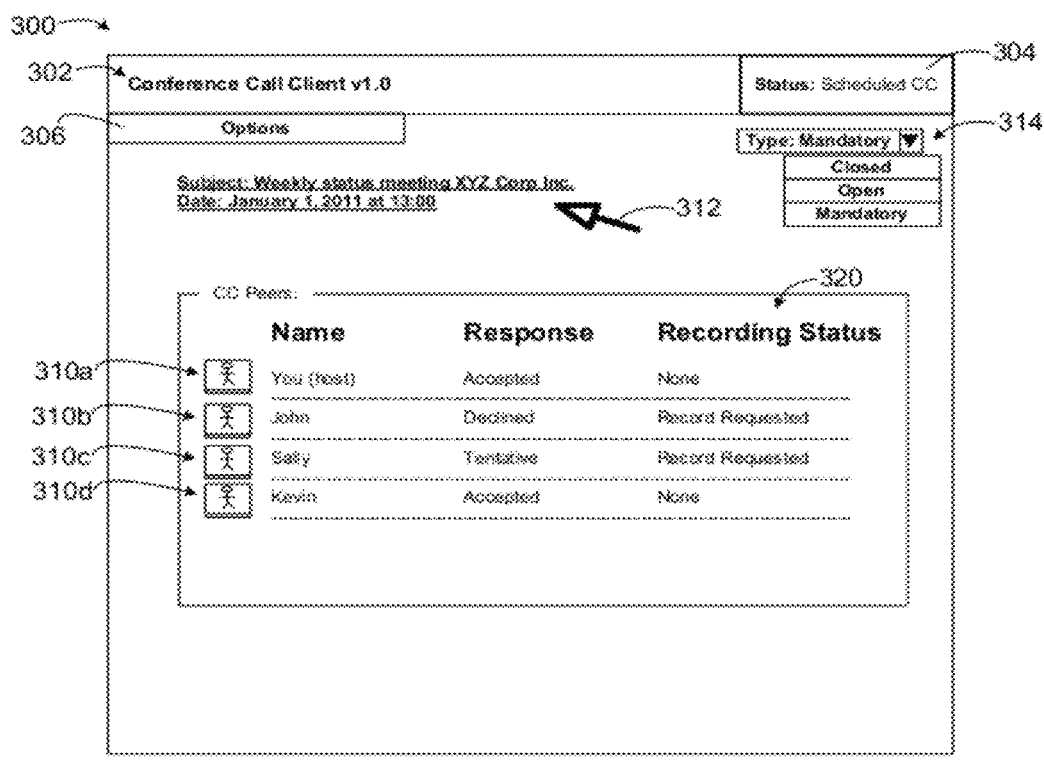
FIG. 8 shows a user interface as displayed on a mobile communication device, for scheduling of a conference call, in accordance with an example embodiment.

Reference is now made to FIG. 8, which shows an example user interface 300 displayed on the display 204 for scheduling a conference call, in accordance with an example embodiment. In the example embodiment shown, the user interface 300 is for example implemented by a conference call application (as a stand-alone or in combination with other applications) resident on the host device 11*a* for specifically communicating with the enterprise communications platform 14. The user interface 300 may form part of a conference call session scheduling process.

Still referring to FIG. 8, the user interface 300 relates to scheduling of a conference call session having a subject and which is to occur at a scheduled time and date. For example, the time and date of the scheduled conference call session may be stored within the conference call application or a calendar application. For example, the scheduled conference call has a subject field of "Weekly status meeting XYZ Corp Inc." and has a scheduled date field of "Jan. 1, 2011 at 13:00". The user interface 300 may be manually triggered by launching and subsequently operating the conference call application.

As shown in FIG. 8, the user interface 300 also includes an options menu 306 to perform functions such as editing the existing scheduled conference call, scheduling new conference calls, and inviting new participants. During the conference call scheduling process, the conference call scheduling information is sent from the host device 11*a* to the enterprise communications platform 14, which stores the information in a memory and sends an invitation message to the specified participants with the conference call scheduling information. In some example embodiments, the host mobile device 11*a* sends an invitation message directly or indirectly to the recipient invitee client devices 11. In some example embodiments, the host mobile device 11*a* receives a response to the invitation message directly or indirectly from the invitee client devices 11. The host mobile device 11*a* may update the enterprise communications platform 14 in such example embodiments.

In some example embodiments, the enterprise communications platform 14 maintains tracking information of the participant devices 11, and updates the host device 11 accordingly with the tracking information shown in FIG. 8.

At the time of the scheduled conference call, or a specified time beforehand, the enterprise communications platform 14 may contact each of the devices 11 to join the media sessions together. In example embodiments, the devices 11 may also dial or link into the enterprise communications platform 14 using dialing or address link information received during scheduling.

As shown in FIG. 8, the user interface 300 includes a title bar 302, a status icon 304, an options menu 306, and participant icons 310a-310d (each or individually 310) which display the status of each participant for the conference call. The participant icons 310 can, for example, be a photo or avatar of the individual user. A cursor 312 is also shown for indicating which item(s) on the user interface 300 are to be selected (e.g., controllable by a user input device such as a touchscreen, touch scrollball or mouse). The status icon 304 displays the present status of the conference call, for example "Scheduled CC" (Conference Call) as shown.

Referring now to the participant icons 310, in the example shown, the user interface 300 is displayed on the host device 11a, indicated as "You—Host" as shown in icon 310a. The participant icon 310b associated with "John" is indicated as "Declined". The participant icon 310b associated with "Sally" is indicated as "Tentative". The participant icon 310d associated with "Kevin" is indicated as "Accepted. Contact information such as e-mail address or phone number for the participants can be pre-stored in association with the participant names (or can be manually entered, as appropriate). The status of each participant icon 310 can also be shown, for example, as Accepted, Tentative, or Declined.

As shown in FIG. 8, in some example embodiments the host device 11a can also select a menu 314 to designate the scheduled conference call as a "closed" conference call. In a "closed" call, only the specified or eligible participant devices 11 designated by the host device 11a may join the call. Additionally, for example, only a specified number of participants may join the call. In some example embodiments, in a "closed" call further authentication of those participant devices 11 may be performed when attempting to access the scheduled conference call. As shown, the host device 11a also has the option to use the menu 314 to set the scheduled conference call as an "open" conference call, wherein any participant device 11 (designated as eligible or not) may join.

As shown in FIG. 8, the host device 11a also has the option to use the menu 314 to set the scheduled conference call as a "mandatory" conference call. A mandatory conference call may have the same characteristics as a closed call. In addition, a mandatory conference call may be mandatory for all participants, who must either participate in the conference call session; or subsequently receive and view a recording of the conference call session.

Generally, in some example embodiments, as part of the conference call session scheduling process, after the conference call scheduling information is configured by the host device 11a, the same information is sent and stored to the enterprise communications platform 14. The enterprise communications platform 14 subsequently communicates with each participant device 11 for inviting to the scheduled conference call and for provisioning at least some of the conference call scheduling information. Each device 11 has an option to Accept, Decline, Tentative, or Forward. If the device 11 selects Accept, this means that the device 11 will participate in the scheduled conference call. If the device 11 selects Decline, for example, the host device 11a is notified by the enterprise communications platform 14 that the scheduled conference call has been declined by the particular device 11. The notification may be made by phone call, data message, email, etc. If the host device 11a Declines, then the entire scheduled conference call may be cancelled and the other devices 11 notified accordingly. If the device 11 selects Tentative, then the enterprise communications platform 14 notifies the host device 11a accordingly.

As shown in FIG. 8, in some example embodiments, the host device 11a may be used to track the recording status 320 of each of the participant devices 11. The recording status 320 is typically synchronized or received from the enterprise communications platform 14, which may store the same information in a memory. The recording status 320 may include, for example, "none" for participant icons 310a and 310d, and "Record Requested" for participant icons 310b and 310c. For example, after receiving in a participant device 11 an invitation message to join a scheduled conference call, the participant device 11 may respond by sending a communication to the enterprise communications platform 14 containing a request for the conference call content to be recorded. The recording status 320 would be updated accordingly as being "Record Requested". After the conference call has ended, the enterprise communications platform 14 may send or push to the requesting device 11 at least some of the recorded conference call content. The recorded conference call content may also be pulled by a request from the device 11.

Figure 9:
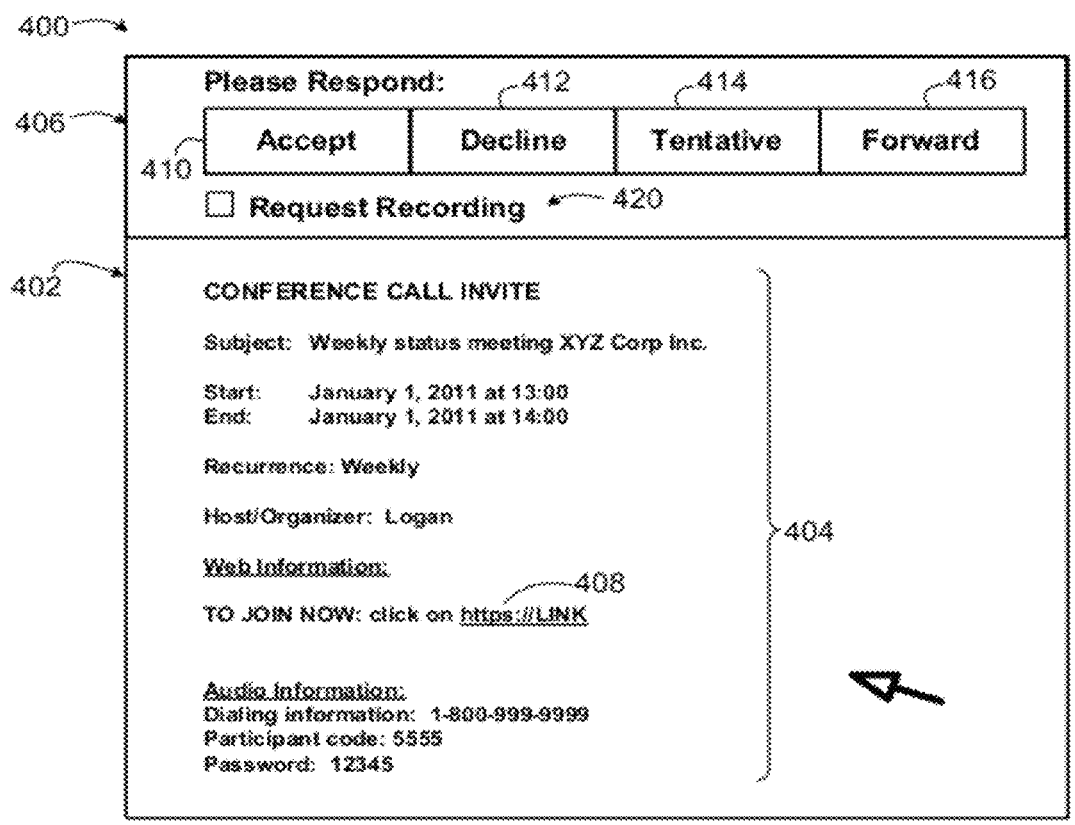
FIG. 9 shows an example user interface for displaying a received invitation message on a mobile communication device, in accordance with an example embodiment.

Thus, reference is now made to FIG. 9, which shows a user interface 400 for displaying a received invitation message 402 on a non-host participant device 11. The device 11 first receives the invitation message 402 from another communication device, such as the enterprise communications platform 14, with respect to a scheduled conference call. As shown, the message 402 as displayed can include a number of fields 404 which relate to conference call scheduling information. The fields 404 include Subject, Start time, End time, Recurrence, Host/Organizer, Web Information, and Audio Conference Information. In some example embodiments, the example user interface 400 may be displayed using a calendar application or a dedicated conference calling application, as a stand-alone or in combination with other applications. The user interface 400 may also form part of the conference call session scheduling process.

The invitation message 402 may be received as an e-mail message designating the participant's e-mail address, but can also be in other forms such as short message service (SMS), SIP message, instant messaging, or calendar invite. Note that, in other example embodiments, the message 402 may alternatively be received directly or indirectly from the host device 11a, rather than from the enterprise communications platform 14.

As shown on the interface 400, a number of response options 406 may be selected in order to respond to the invitation message 402. As shown, the response options 406 include Accept 410, Decline 412, Tentative 414, or Forward 416. Upon selection of one or more of the response options 406, a communication containing the response is sent to the enterprise communications platform 14 for tracking purposes. In further example embodiments, selection of the Accept 410 option may result in the details of the invitation message 402 being stored in a calendar application of the device 11. The Forward 416 option may be used to forward the invitation message to a new participant client device. In some example embodiments, the Forward 416 option can be further restricted depending on whether the new participant client device is permitted to join the conference call (for a closed call), for example limiting participants to those associated with a same enterprise. In some example embodiments, in a closed call or a mandatory call the participants may be restricted to only the immediately invited participants. Accordingly, the Forward 416 option may be disabled or forbidden. In some example embodiments, the Forward 416 option can be further restricted if the maximum or specified number of participants is reached.

Still referring to FIG. 9, in some example embodiments there is also displayed a Request Recording option 420, for example using a checkbox. The Request Recording option 420 may be used to request subsequently recorded conference call content with respect to the scheduled conference call. For example, a user may know that he or she will not be able to attend the scheduled conference call session and may select (check off) the Request Recording option 420 prior to selecting the Decline 412 option. In other example embodiments, the user may want a recording of the conference call session no matter what the response, for example even when selecting the Accept 410 option.

Still referring to FIG. 9, in some example embodiments, there may be forced selection of the Request Recording option 420. For example, for a mandatory call when "mandatory" is selected from menu 314 (FIG. 8), the Request Recording option 420 is automatically selected and may not be de-selected. In some example embodiments, for example for a mandatory call when "mandatory" is selected from menu 314 (FIG. 8), the Decline 414 option, the Tentative 414 option, and/or the Forward 416 option may not be selected unless the Request Recording option 420 is selected first. A suitable warning message or prompt may be displayed in response, as appropriate. The forcing of the Request Recording option 420 may be a client application determining that the call is "mandatory" (e.g. based on a "mandatory" flag of the received invitation); or in other embodiments an explicit instruction from the enterprise communication platform 14.

As shown in FIG. 9, the invitation message 402 also includes "Web Information" which includes an option to select an address link 408 to activate a "Join Now" or "Meet Now" function. At the scheduled date and time of the conference call, if the device 11 had accepted the invitation message 402, the device 11 may receive a user input selecting the address link 408 to request joining the conference call session. If the conference call is a closed call, the enterprise communications platform 14 may then authenticate the device 11, for example by authenticating an identifier of the device 11 (in one embodiment, using a particular persistent device identifier). Upon authentication, a conference call session can be established between the device 11 and the enterprise communications platform 14, which can include a media session 126 (FIG. 6).

As can be appreciated, in some example embodiments the address link 408 identifies the enterprise communications platform 14 as well as the scheduled conference call session and/or the participant identifier, and can include a Uniform Resource Locator (URL), a Uniform Resource Identifier (URI), or other suitable address.

During the conference call session, the enterprise communications platform 14 records the conference call content and stores in memory, either in native form or using suitable compression processes. In some example embodiments, the content may include presentation material (e.g. a PowerPoint slide set), of which the enterprise communications platform 14 may further compress and render the slide set for viewing on the participant device 11. The content and presentation material may also be compressed to reduce bandwidth during over the air transmission. The presentation content may, for example, be appended to the audio or video content. In some example embodiments, after the conference call session, the enterprise communications platform 14 sends the conference call content (compressed or otherwise) to those devices 11 which had previously sent a recording request, or in some example embodiments any absentee devices 11. When sending, the enterprise communications platform 14 may synchronize presentation material such as slides with the audio or video portion of the call so that the participant device 11 is displaying the correct material.

Figure 10:
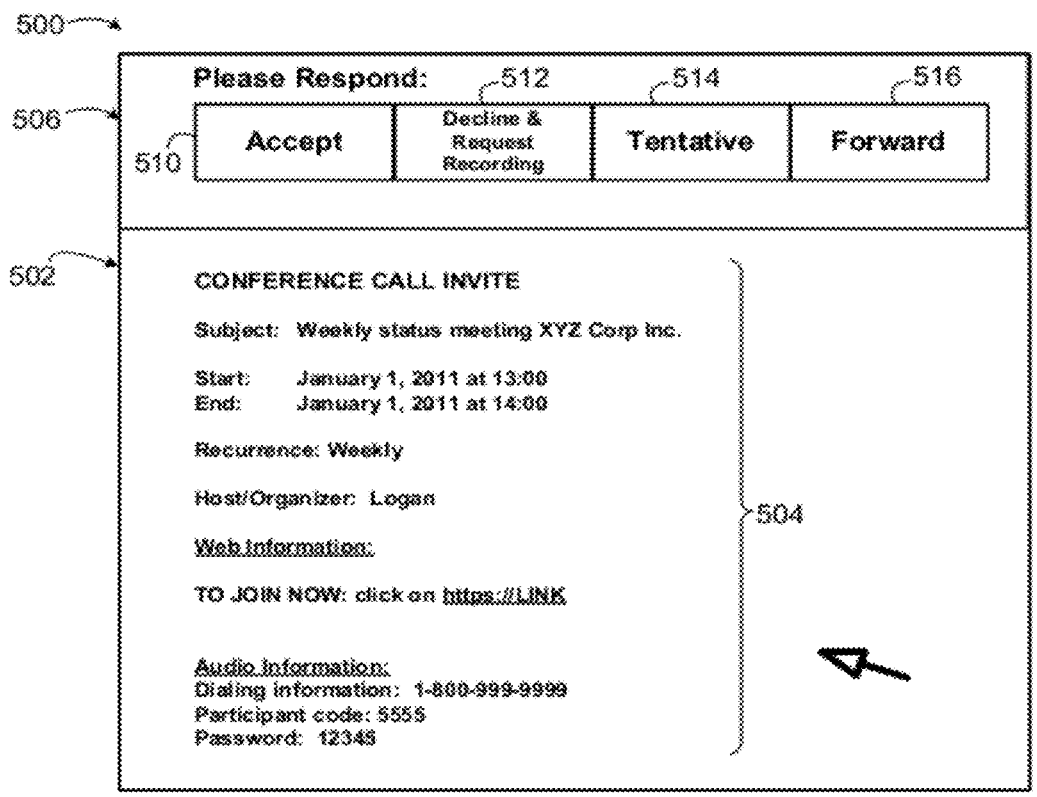
FIG. 10 shows another example user interface for displaying a received invitation message on a mobile communication device, in accordance with an alternate example embodiment.

Reference is now made to FIG. 10, which shows another example user interface 500 for displaying a received invitation message 502 on a non-host participant device 11, in accordance with an alternate example embodiment. In the example embodiment shown, a user may be forced to request a recording of the conference call if the user wishes to decline attendance of a scheduled conference call.

The device 11 first receives the invitation message 502 from another communication device, such as the enterprise communications platform 14, with respect to a scheduled conference call. As shown, the message 502 as displayed can include a number of fields 504 which relate to conference call scheduling information. The fields 504 include Subject, Start time, End time, Recurrence, Host/Organizer, Web Information, and Audio Conference Information.

As shown on the interface 500, a number of response options 506 may be selected in order to respond to the invitation message 502. As shown, the response options 506 include Accept 510, Decline 512, Tentative 514, or Forward 516, as described above.

Still referring to FIG. 10, as shown, the Decline 512 option may further be combined with an option to request a recording. For example, the Decline 512 option or icon may state "Decline and Request Recording", as shown in FIG. 10. For example, a user may know that they will not be able to attend the scheduled conference call session, and accordingly selection of the Decline 512 option automatically requests a copy of a recording of the conference call. Accordingly, the combined Decline 512 option may be used to receive a single-action response to submit these responses. A similar combined option to request recording may be displayed for the Tentative 514 or Forward 516 options (not specifically shown).

In some example embodiments, for a mandatory call, an application on the device 11 may be configured to display the modified Decline 512 option having the combined request for recording, as shown. For open calls or non-mandatory calls, the device 11 may display a regular Decline option button.

Figure 11:
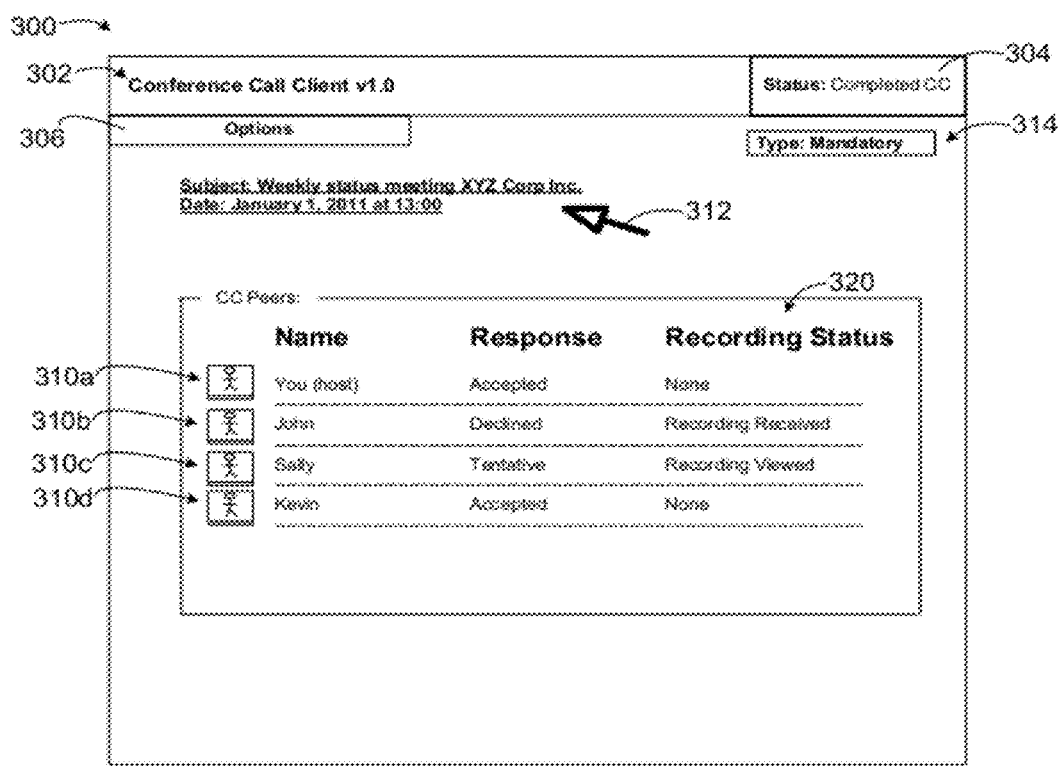
FIG. 11 shows the user interface of FIG. 8 for a completed conference call, in accordance with an example embodiment.

Reference is now made to FIG. 11, which shows the recording status 320 feature of the interface 300 in greater detail, for example after the conference call has occurred. As shown on the interface 300, the status icon 304 displays that the status of the conference call is a "Completed CC" (Conference Call). During the conference call session, the enterprise communications platform 14 records the conference call content and stores in memory. In some example embodiments, after the conference call session, the enterprise communications platform 14 sends the conference call content to those devices 11 which had previously sent a recording request, or in some example embodiments any absentee devices 11.

As shown by recording status 320, the host device 11a may track whether another device 11 has received a recording of the conference call content. As shown, the recording status 320 may now include, for example, "Recording Received" for participant icon 310b and "Recording Viewed" for participant icon 310c. Note that, in some example embodiments, the enterprise communications platform 14 may also maintain tracking of the recording status 320 of the participants, and may update the host device 11 accordingly.

In order to facilitate such tracking of recording status 320, each non-host participant device 11 may include an application which receives the conference call content from the enterprise communications platform 14. Once received and in response, the application of the device 11 may send a confirmation message of receipt to the enterprise communications platform 14. Such a setting may be configurable by, for example, the host device 11a or an administrator of an enterprise, etc. This confirmation message would trigger the "Recording Received" status.

The received conference call content may then be displayed on the device 11. In some example embodiments, this may be performed by a general-purpose media application such as Windows Media™ Player, or by a dedicated content player for combining audio, video and/or data or presentation content. Multiple video windows (each representing a video of each participant) may also be displayed, as appropriate.

Once the conference call content is displayed on a device 11, that particular device 11 may detect a play event, and if so send a notification message to the enterprise communications platform 14 accordingly that the recording was viewed (or at least played) on the device 11. The play event may include playing the content from beginning to end. Such a setting may be configurable by, for example, the host device 11a or an administrator of an enterprise, etc. The sent notification message would trigger the "Recording Viewed" status.

In some example embodiments, additional periodic reminder messages are automatically sent by the enterprise communications platform 14 to those devices 11 which have the recording status 430 of "Recording Received", but have not yet viewed or opened the conference call content.

In some example embodiments, not shown in FIG. 11, during the conference call the enterprise communications platform 14 may determine that a device 11 had Accepted the conference call but did not actually attend. In such an example embodiment, the enterprise communications platform 14 may send or push the conference call content to that device 11 after the conference call, with similar recording status 320 being tracked such as "Recording Auto-Pushed".

In some example embodiments, partial progress may be tracked, for example by percentage of time viewed or by tracking milestones or modules which are flagged during the recorded conference call, etc.

In some example embodiments, additional questions to be answered may also be sent to the devices 11 along with the conference call content, for example for training and evaluation purposes. In some example embodiments, the answers may be in multiple-choice or True/False format, which can readily track correctness of the exact answers. In other example embodiments, there may be survey or opinion-type questions (multiple choice or otherwise) which do not require a specific answer, and only the fact that an answer was given is tracked. In other example embodiments, long-form answers are provided which can be manually assessed by the host user associated with the host device 11a. The answers to the questions may be received and tracked by the enterprise communications platform 14 accordingly. For example, this may include the host device 11a sending a list of questions (and answers if appropriate) to the enterprise communications platform 14. This may be done prior to, during, of after the scheduled conference call. The enterprise communications platform 14 may then send the questions to the participant devices 11 for answering. This may be done prior to, during, of after the scheduled conference call. The enterprise communications platform 14 may then receive the answers from the participant devices 11, and compare with any stored answers (if appropriate). The enterprise communications platform 14 may also forward the answers to the host device 11a. The answers may then be received and tracked by the host device 11a. Finally, the host user may enter any approvals of the answers in the host device 11a, which may further send corresponding approvals to the enterprise communications platform 14 for tracking purposes. If the answers from a given participant device 11 are not approved (for incompleteness or incorrect answers), the host device 11 or the enterprise communications platform 14 may notify the participant device 11 accordingly, for re-answering of at least the incomplete or incorrect answers (or sometimes some or all of the questions).

Figure 12:
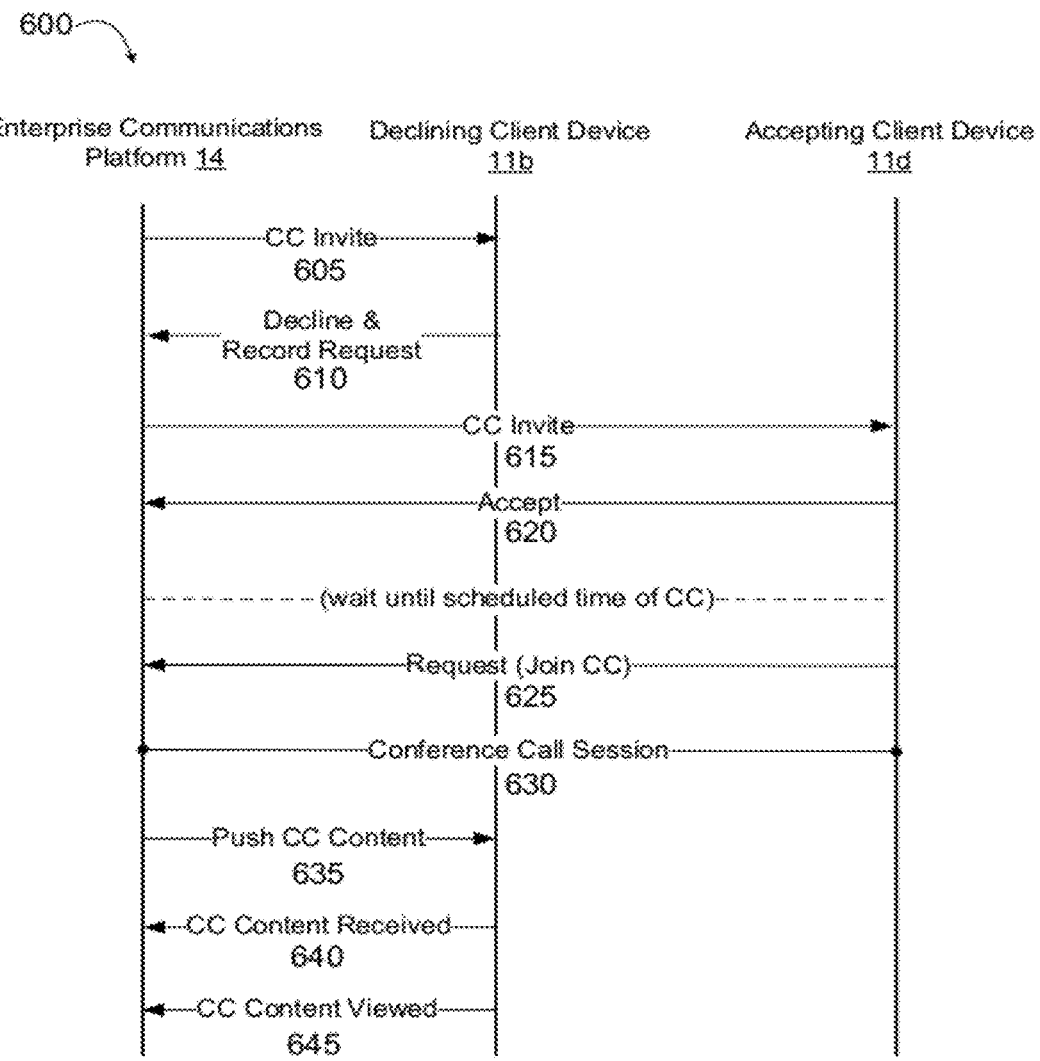
FIG. 12 shows an example conversation between the enterprise communications platform and client devices in accordance with an example embodiment.

Reference is now made to FIG. 12, which shows an example conversation 600 between the enterprise communications platform 14, a declining device 11b, and an accepting device 11d, in accordance with an example embodiment. Generally, the declining device 11b has declined participation in the scheduled conference call session, while the accepting device 11d has accepted participation in the scheduled conference call session. In the example embodiment shown, the enterprise communications platform 14 includes a memory for storing conference call scheduling information, which can include tracking the invitation message responses as well as the recording status 320 of each device 11b, 11d. The memory may also store recorded conference call content which is recorded during the conference call session. Reference to "communication" may be singular or plural.

At communication 605, the enterprise communications platform 14 sends to the declining client device 11b an invitation message containing at least some of the conference call scheduling information with respect to the scheduled conference call session. The declining client device 11b displays an interface in relation to the invitation message, for example the interface 400 (FIG. 9). The interface can include an option to Decline the invitation message. The interface 400 can also include an option to send a request for recorded conference call content of the scheduled conference call session. At communication 610, the response to the invitation message is sent, for example "Decline" in this example (along with the request for content).

At communication 615, in example embodiments, the enterprise communications platform 14 may send to the accepting client device 11d an invitation message. At communication 620, the accepting client device 11d may send a response to the invitation message, for example "Accept" in this example (without any request for content).

At communication 625, at the time of the scheduled conference call (or beforehand), the accepting device 11d may send a join now request to the enterprise communications platform 14 with respect to the scheduled conference call. For example, this may be accomplished by selecting a "join now" link, or by simply dialing into the enterprise communications platform 14. This may be performed using an identifier of the accepting device 11d, for example an e-mail address, a Personal Information Number (PIN), or a telephone number (e.g. identified using call display). The enterprise communications platform 14 then determines whether the accepting device 11d is authorized to participate. In response, at communication 630 a conference call session is established, which can include a media leg as between the enterprise communications platform 14 and the accepting device 11d. The media leg may then be joined with other media legs for establishing the conference call session 630. The enterprise communications platform 14 records the conference call content during the conference call session and stores in memory.

Continuing with the example, at communication 635, after completion of the scheduled conference call, the enterprise communications platform 14 may automatically send at least some of the recorded conference call content to the declining device 11b based on detection of an absence event. In some example embodiments, the recorded conference call content is sent to only those devices 11 which specifically responded to the invitation message with a request for the content. In some example embodiments, the content is sent to any device 11 which is detected as being absent for the conference call session.

At communication 640, the declining device 11b may send a message for confirmation of receiving the recorded conference call content. At communication 645, when the user views the content, the declining device 11b may detect a play event of the recorded conference call content, and in response send a message to the enterprise communications platform 14 for confirmation of playing the recorded conference call content.

It would be appreciated that, some conventional conference call systems may flag participation as "mandatory", but may not be truly mandatory in terms of being able to ensure attendance or review from the invited participants.

Some example embodiments may be used for teaching or training. For example, if the conference call was a learning session wherein the user is expected to review material presented, example embodiments can monitor the user's progress through the recording and track when the user has completed or to what stage the user completes the viewing of the recording. In some example embodiments, the recording can also include question(s) which must be completed by the user with results reported back to the host device 11a or the enterprise communications platform 14.

In some example embodiments, the enterprise communications platform 14 may also integrate the audio portion of the conference call with a speech to text converter and provide a transcript of the call in the form of a document.

In some example embodiments, one or more of the client devices 11 may be permitted to annotate or comment on materials presented during the call, followed by having his or her annotations or comments distributed to the other participants along with the conference call content.

In some example embodiments, the content is suitably compressed or encrypted by the enterprise communications platform 14, for example when sending content to a mobile handheld communication device 11. In some example embodiments, the recorded conference call content is received and stored within the device 11. Accordingly, the content may be locally resident and playable out of network coverage.

It can be appreciated that the specific words as shown in the various user interfaces are intended to be illustrative only. For example, any suitable words or phrases may be used, and would not be limited to the English language. For example, any number of multi-lingual variations in different languages may be displayed or output from the device.

In some example embodiments, all "closed" may be considered "mandatory" calls (rather than having a separate "mandatory" option). In some example embodiments, specific users or devices may be selectively designated as being "mandatory", while others may be designated as not being "mandatory". In another example, users of a specified group may be automatically considered "mandatory", for example some or all devices associated with a particular enterprise (e.g. employees or a company or specific department, etc.).

Variations of the above example methods may be used. While some of the above examples have been described as occurring in a particular order, it will be appreciated to persons skilled in the art that some of the messages or steps or processes may be performed in a different order provided that the result of the changed order of any given step will not prevent or impair the occurrence of subsequent steps. Furthermore, some of the messages or steps described above may be removed or combined in other embodiments, and some of the messages or steps described above may be separated into a number of sub-messages or sub-steps in other embodiments. Even further, some or all of the steps of the conversations may be repeated, as necessary. Elements described as methods or steps similarly apply to systems or subcomponents, and vice-versa. Reference to such words as "sending" or "receiving" could be interchanged depending on the perspective of the particular device.

Variations may be made to some example embodiments, which may include combinations and sub-combinations of any of the above. The various embodiments presented above are merely examples and are in no way meant to limit the scope of this disclosure. Variations of the innovations described herein will be apparent to persons of ordinary skill in the art having the benefit of the present disclosure, such variations being within the intended scope of the present disclosure. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present disclosure as a whole. The subject matter described herein intends to cover and embrace all suitable changes in technology.

What is claimed is:

1. A method for scheduling a conference call, the method comprising:
   receiving, in a first communication device, an invitation message containing at least some conference call scheduling information with respect to a scheduled conference call session;
   displaying an interface in relation to the invitation message, the interface including an option to send a request for recorded conference call content of the scheduled conference call session;
   receiving an input selecting the option; and
   sending a communication to a second communication device including a response to the invitation message and including said request for recorded conference call content.

2. The method as claimed in claim 1 wherein said sending of the communication is in response to selection of the option through the interface.

3. The method as claimed in claim 1 wherein said sending of the communication is performed as part of a conference call scheduling process prior to occurrence of the conference call session.

4. The method as claimed in claim 1 further comprising receiving in the first communication device the recorded conference call content and storing in a memory.

5. The method as claimed in claim 4 further comprising sending from the first communication device a message for confirmation of receiving the recorded conference call content.

6. The method as claimed in claim 4 further comprising detecting a play event of the recorded conference call content in the first communication device, and sending a message to the second communication device for confirmation of playing the recorded conference call content.

7. The method as claimed in claim 1 wherein the option includes a single action response for sending the request and for sending the response to the invitation message.

8. The method as claimed in claim 1 wherein the response is a decline response to the invitation message.

9. The method as claimed in claim 1 wherein the second communication device includes a conference call server.

10. The method as claimed in claim 1 wherein the second communication device includes a host device.

11. The method as claimed in claim 1 further comprising forcing selection of the option in the first communication device.

12. A non-transitory computer readable medium having recorded thereon statements and instructions that, when executed by one or more devices, cause the one or more device to perform a method for scheduling a conference call, the method comprising:
    receiving, in a first communication device, an invitation message containing at least some conference call scheduling information with respect to a scheduled conference call session;
    displaying an interface in relation to the invitation message, the interface including an option to send a request for recorded conference call content of the scheduled conference call session;
    receiving an input selecting the option; and
    sending a communication to a second communication device including a response to the invitation message and including said request for recorded conference call content.

13. A communication device comprising:
    a controller;
    a communications subsystem for receiving an invitation message containing at least some conference call scheduling information with respect to a scheduled conference call session;
    a display for displaying an interface in relation to the invitation message, the interface including an option to send a request for recorded conference call content of the scheduled conference call session;
    wherein the controller detects an input selecting the option; and
    wherein the controller controls the communications subsystem to send a communication to a second communication device including a response to the invitation message and including said request for recorded conference call content.

14. The communication device as claimed in claim 13 wherein said sending of the communication is in response to selection of the option through the interface.

15. The communication device as claimed in claim 13 wherein said sending of the communication is performed as part of a conference call scheduling process prior to occurrence of the conference call session.

16. The communication device as claimed in claim 13 wherein the controller is further configured for receiving the recorded conference call content and storing in a memory.

17. The communication device as claimed in claim 16 wherein the controller is further configured for sending a message for confirmation of receiving the recorded conference call content.

18. The communication device as claimed in claim 16 wherein the controller is further configured for detecting a play event of the recorded conference call content, and sending a message to the second communication device for confirmation of playing the recorded conference call content.

19. The communication device as claimed in claim 13 wherein the option includes a single action response for sending the request and for sending the response to the invitation message.

20. The communication device as claimed in claim 13 wherein the response is a decline response to the invitation message.

21. The communication device as claimed in claim 13 wherein the second communication device includes a conference call server.

22. The communication device as claimed in claim 13 wherein the second communication device includes a host device.

23. The communication device as claimed in claim 13 further comprising the option being automatically selected in the communication device.

* * * * *